(12) United States Patent
Tanaka

(10) Patent No.: US 11,753,491 B2
(45) Date of Patent: Sep. 12, 2023

(54) LOW-REFLECTIVITY BLACK FILM AND METHOD OF MANUFACTURING LAMINATED BODY

(71) Applicants: TOYO INK SC HOLDINGS CO., LTD., Tokyo (JP); TOYOCOLOR CO., LTD., Tokyo (JP)

(72) Inventor: Naohiro Tanaka, Tokyo (JP)

(73) Assignees: TOYO INK SC HOLDINGS CO., LTD., Tokyo (JP); TOYOCOLOR CO., LTD, Tokyo (JP)

(*) Notice: Subject to any disclaimer, the term of this patent is extended or adjusted under 35 U.S.C. 154(b) by 510 days.

(21) Appl. No.: 16/770,144

(22) PCT Filed: Dec. 6, 2018

(86) PCT No.: PCT/JP2018/044865
§ 371 (c)(1),
(2) Date: Jun. 5, 2020

(87) PCT Pub. No.: WO2019/111990
PCT Pub. Date: Jun. 13, 2019

(65) Prior Publication Data
US 2020/0385501 A1  Dec. 10, 2020

(30) Foreign Application Priority Data

Dec. 7, 2017  (JP) ................ 2017-235563
Apr. 19, 2018  (JP) ................ 2018-080718

(51) Int. Cl.
| C08F 220/18 | (2006.01) |
| B05D 5/06 | (2006.01) |
| C08J 5/18 | (2006.01) |
| C08K 3/04 | (2006.01) |
| G02B 1/111 | (2015.01) |

(52) U.S. Cl.
CPC .......... *C08F 220/1804* (2020.02); *B05D 5/06* (2013.01); *C08J 5/18* (2013.01); *C08K 3/04* (2013.01); *G02B 1/111* (2013.01); *C08J 2333/12* (2013.01); *C08K 2201/006* (2013.01)

(58) Field of Classification Search
CPC .......... B05D 5/06; C08J 5/18–2333/12; C08F 220/1804; C08K 3/04–2201/006; G02B 1/111; G02B 1/04; G02B 1/041–5/20; G02B 5/22

USPC ...................................... 428/312.2
See application file for complete search history.

(56) References Cited

U.S. PATENT DOCUMENTS

2013/0337161 A1  12/2013  Akimoto et al.
2015/0346408 A1  12/2015  Mizutani et al.

FOREIGN PATENT DOCUMENTS

| CN | 103314063 A | 9/2013 | |
| CN | 104854488 A | 8/2015 | |
| JP | H08-054502 A | 2/1996 | |
| JP | 2006182818 A * | 7/2006 | ............... C09C 1/48 |

OTHER PUBLICATIONS

Farrier "Influence of Surface Roughness On the Specular Reflectance of Low Gloss Coatings Using Bidirectional" Thesis Oct. 2016, https://apps.dtic.mil/sti/pdfs/ADA464906.pdf (Year: 2016).*
International Search Report dated Mar. 5, 2019 in corresponding International Application No. PCT/JP2018/044865; 5 pages.
Sun et al. "Super Black Material from Low-Density Carbon Aerogels with Subwavelength Structures." ACS NANO. vol. 10, No. 10. Oct. 25, 2016. pp. 9123-9128.
Chang et al. "Candle soot nanoparticles-polydimethylsiloxane composites for laser ultrasound transducers." Applied Physics Letters. vol. 107, No. 16. Oct. 19, 2015. 5 pages.
Qahtan et al. "Fabrication of Water Jet Resistant and Thermally Stable Superhydrophobic Surfaces by Spray Coating of Candle Soot Dispersion." Scientific Reports. vol. 7, No. 1. Aug. 8, 2017. 7 pages.
Extended European Search Report dated Aug. 27, 2021, in connection with corresponding EP Application No. 18885019.2; 13 pages.
Chinese Office Action dated May 10, 2021, in connection with corresponding CN Application No. 201880079014.3 (24 pp., including machine-generated English translation).

* cited by examiner

*Primary Examiner* — Tri V Nguyen
(74) *Attorney, Agent, or Firm* — Maier & Maier, PLLC

(57) ABSTRACT

A low-reflectivity black film according includes porous black pigment having a porosity of 50% or larger and a binder component at a volume ratio of 50:50-100:0, in which, with regard to surface roughness parameters Rt and Ra, Rt is 0.15-5 μm and Ra is 0.01-0.5 μm, an L* value is equal to or smaller than 20, and in a range of 400-700 nm, the maximum value of regular reflectivity is equal to or smaller than 0.8%, the maximum value of scattering reflectivity is equal to or smaller than 2%, and the maximum value of light transmittance is equal to or smaller than 5%.

8 Claims, No Drawings

LOW-REFLECTIVITY BLACK FILM AND METHOD OF MANUFACTURING LAMINATED BODY

This application is based upon and claims the benefit of priority from Japanese Patent Application Nos. 2017-235563 filed on Dec. 7, 2017, and 2018-080718 filed on Apr. 19, 2018, the disclosures of which are incorporated herein in its entirety by reference.

FIELD

The present disclosure relates to a low-reflectivity black film and a method of manufacturing a laminated body including a low-reflectivity black film.

BACKGROUND

A method of causing a film to contain organic fine particles or inorganic fine particles to form irregularities on a surface of the film, thereby making the film matte has been known as a method of making a film have a low reflectivity. Although it is possible to reduce regular reflectivity in this method, scattering due to the irregularities tends to become strong and scattering reflectivity tends to become large.

There is another method of arranging a low refractive index film on a surface of a film. For example, Japanese Unexamined Patent Application Publication No. H08-054502 discloses a multi-layer film in which a film having a refractive index lower than that of a colored low resistance film including highly conductive carbon black is formed on this colored low resistance film). Japanese Unexamined Patent Application Publication No. H08-054502 discloses that a material that forms the low refractive index film is preferably Si compounds in view of a refractive index and a film intensity (paragraph 0038).

SUMMARY

According to the method of arranging a low refractive index film on the surface of the film, the lower limit of the refractive index of an organic substance and an inorganic substance that compose the low refractive index film is between 1.3 and 1.4, which is greatly different from the refractive index of the air, which is 1.0. In this method, the reduction level of the reflectance is not sufficiently high.

Incidentally, black antireflection films are preferably used for products like optical devices such as cameras and displays such as televisions where leakage of light causes a problem. It is desired that the black antireflection films used for these applications have a low reflectivity, a high jet black property, and smoothness without any roughness.

The refractive index of a film can be reduced by using a porous material containing a lot of air. However, since the porous material typically has a high specific surface area, dispersibility or dispersion stability to a dispersion medium is poor, and thus the film formation tends to be difficult. Further, the irregularities on the film surface become large, which causes the scattering reflection to increase and the smoothness to decrease.

When a relatively large amount of a dispersing agent or a resin is added to a dispersion liquid including a porous material in order to improve the dispersion state of the dispersion liquid, the resin and the like may enter micropores of the porous material and the porosity may be thus impaired. Otherwise, due to the presence of the dispersing agent or the resin, the refractive index of the film may become large and the reflectance may become large. When the dispersion time is prolonged or the dispersion is performed by applying shear in order to improve the dispersion state of the dispersion liquid including the porous material, the porous structure may be destroyed.

For example, in Examples of Patent Literature 1, coating liquid for forming a colored low resistance film including carbon black having a dispersed particle diameter of 130 nm is obtained (Example 1 etc.). The surface of the film formed using the coating liquid including the porous material having a small dispersed particle diameter is extremely smooth, and regular reflection tends to become large. In addition, the thickness of the film that is obtained is as thin as 100 nm. This film has a high level of transparency and the reduction in the level of the reflectance of this film is not sufficiently high. In addition, jet black property of this film tends to be insufficient.

As described above, according to related art, it is technically difficult to avoid the tradeoff between the regular reflectivity and the scattering reflectivity. In particular, it is extremely difficult to obtain a film that solves this problem and has a low reflectivity, a sufficiently high level of smoothness, and a high jet black property.

The present disclosure aims to provide a low-reflectivity black film having an excellently low reflectivity due to small regular reflection and small scattering reflection, and having a sufficiently high level of smoothness on its surface and a high degree of blackness.

The present disclosure relates to the following [1]-[11].
[1] A low-reflectivity black film including:
a porous black pigment having a porosity of 50% or larger and a binder component at a volume ratio of 50:50-100:0, in which
with regard to surface roughness parameters Rt and Ra, Rt is 0.15-5 µm and Ra is 0.01-0.5 µm,
an L* value is equal to or smaller than 20, and
in a range of 400-700 nm, the maximum value of regular reflectivity is equal to or smaller than 0.8%, the maximum value of scattering reflectivity is equal to or smaller than 2%, and the maximum value of light transmittance is equal to or smaller than 5%.
[2] The low-reflectivity black film according to [1], in which in the range of 400-700 nm, the maximum value of the regular reflectivity is equal to or smaller than 0.4% and the maximum value of the scattering reflectivity is equal to or smaller than 1.3%.
[3] The low-reflectivity black film according to [1] or [2], in which Rt is 0.15-2 µm and Ra is 0.01-0.15 µm.
[4] The low-reflectivity black film according to any one of [1] to [3], in which the low-reflectivity black film has a thickness equal to or larger than 0.3 µm.
[5] The low-reflectivity black film according to any one of [1] to [4], in which a BET specific surface area of the porous black pigment is equal to or larger than 600 m$^2$/g.
[6] The low-reflectivity black film according to any one of [1] to [5], in which a volume ratio of the porous black pigment to the binder component is 85:15-95:5.
[7] The low-reflectivity black film according to any one of [1] to [6], in which the porous black pigment is porous carbon black.
[8] A method of manufacturing a laminated body including a substrate and a low-reflectivity black film, the method including:
a step of preparing a paint for a low-reflectivity black film containing a porous black pigment having a porosity of 50% or larger, a dispersion medium, and a binder component as necessary, an average dispersed particle size (d50) of the porous black pigment being 0.2-10 μm;

a step of coating the substrate with the paint for the low-reflectivity black film; and a step of drying a coating film formed of the paint for the low-reflectivity black film, in which the low-reflectivity black film includes the porous black pigment and the binder component at a volume ratio of 50:50-100:0, with regard to surface roughness parameters Rt and Ra, Rt is 0.15-5 μm and Ra is 0.01-0.5 μm, an L* value is equal to or smaller than 20, and in a range of 400-700 nm, the maximum value of regular reflectivity is equal to or smaller than 0.8%, the maximum value of scattering reflectivity is equal to or smaller than 2%, and the maximum value of light transmittance is equal to or smaller than 5%.

[9] A method of manufacturing a laminated body including a substrate, an adhesive layer, and a low-reflectivity black film, the method including the following Steps 1-4:

Step 1: coating a peelable surface of a peelable sheet with a paint for a low-reflectivity black film containing a porous black pigment having a porosity of 50% or larger, a dispersion medium, and a binder component as necessary, and drying a coating film formed of the paint to form a black film;

Step 2: providing the adhesive layer on the substrate;

Step 3: overlapping the adhesive layer provided on the substrate with the black film formed on the peelable sheet, and pressing or heating and pressing the overlapped layer and film to obtain a laminated body with a peelable sheet including the substrate, the adhesive layer, the black film, and the peelable sheet; and Step 4: peeling the peelable sheet from the laminated body with the peelable sheet to form a low-reflectivity black film that includes the porous black pigment and the binder component at a volume ratio of 50:50-100:0, in which, with regard to surface roughness parameters Rt and Ra, Rt is 0.15-5 μm and Ra is 0.01-0.5 μm, an L* value is equal to or smaller than 20, and in a range of 400-700 nm, the maximum value of regular reflectivity is equal to or smaller than 0.8%, the maximum value of scattering reflectivity is equal to or smaller than 2%, and the maximum value of light transmittance is equal to or smaller than 5%.

[10] The method of manufacturing the laminated body according to [8] or [9], in which the low-reflectivity black film has a film thickness equal or larger than 0.3 μm.

[11] The method of manufacturing the laminated body according to any one of [8] to [10], in which a BET specific surface area of the porous black pigment is equal to or larger than 600 m$^2$/g.

According to the present disclosure, it is possible to provide a low-reflectivity black film having an excellent low reflectivity due to small regular reflection and small scattering reflection, and having a sufficiently high level of smoothness on its surface and a high degree of blackness.

DETAILED DESCRIPTION

In the following, the present disclosure will be described in detail.

[Principles of Low Reflectivity Expression]

The principles of low reflectivity expression of the present disclosure will be described.

In the present disclosure, a porous black pigment having a relatively high porosity is used. As the porosity of a porous material becomes higher, the refractive index thereof becomes closer to that of the air. That is, the refractive index of a film including a porous material having a high porosity becomes close to 1, which is the refractive index of the air. Typically, light that is made incident on the film from the air layer is reflected at a reflectance in accordance with the difference between the refractive index of the air layer and the refractive index of the film. By making the refractive index of the film close to the refractive index of the air layer, a light reflection interface is minimized and thus the reflectance becomes small. Further, when the porous black pigment is used, the porous black pigment in the film efficiently absorbs light, whereby it is possible to construct a structure in which the light that has once entered the film does not exit to the outside.

However, it is practically difficult to make the refractive index of the porous material equal to the refractive index of the air, and the refractive index of the film naturally becomes higher than that of the air. Therefore, the use of the material-specific refractive index difference alone does not sufficiently contribute to reducing the reflectance of the film. In order to solve this problem, in the present disclosure, the surface of the film is made to have irregularities to such an extent that the smoothness of appearance is not impaired, thereby reducing the reflectance.

[Porous Black Pigment]

The porous black pigment that can be used for the present disclosure is not particularly limited as long as it has a porosity of 50% or larger and examples of the porous black pigment include carbon black, graphite, known oxide black pigments, a porous body and the like having a form like aerogel which is based on the above black pigments. These materials may be used alone or in a combination thereof. It is particularly preferable that porous carbon black is used alone.

As described above in [Principles of low reflectivity expression], the refractive index of the porous black pigment becomes closer to the refractive index of the air layer as the porosity becomes higher. It is therefore required that the porosity be 50% or larger, and preferably 75% or larger.

While a non-porous black pigment may also be used, the amount of the non-porous black pigment to be added is preferably 50 pts·mass or lower with respect to 100 pts·mass of the porous black pigment from the viewpoint of low reflectivity expression. The non-porous black pigment is not particularly limited as long as it exhibits black color, and examples of the non-porous black pigment include carbon black, graphite, known oxide black pigments and the like.

The porosity may be calculated by a known method such as a physical gas adsorption method, a t-plot method, and a BJH method.

The specific surface area of the porous black pigment is preferably 600 m$^2$/g or larger, and more preferably, 1200 m$^2$/g or larger. The specific surface area is preferably high from a viewpoint of low reflectivity since as the specific surface area becomes higher, finer irregularities are formed on the surface of the porous black pigment and a lot of air is included in these finer irregularities.

The low-reflectivity black coating film according to the present disclosure may include, besides the porous black pigment, a binder component as necessary.

The occupied volume ratio of the porous black pigment to the binder component is 50:50-100:0, preferably, 65:35-100:0, and more preferably, 85:15-95:5. When the porous black pigment is contained at a ratio larger than 50:50, the refractive index of the film can be reduced and the reflectivity can be made low. Further, when the porous black pigment is contained at a ratio larger than 65:35, the refractive index of the film can be further lowered and the reflectance can be greatly reduced. Further, by adding the binder component within the above ratio, the strength of the film can be improved.

The occupied volume ratio of each of the components can be theoretically obtained from the mass and the specific gravity of each of the components. The specific gravity of the components other than the porous black pigment is estimated to be "1 (g/cm$^3$)".

For example, the occupied volume ratio of the porous black pigment can be theoretically obtained as follows.

$$\text{Volume of the porous black pigment} = \text{mass (g)} \div (1-\text{porosity}) \quad (1)$$

For example, the volume of 1 g of porous black pigment having a porosity of 80% is as follows.

$$1 \text{ (g)} \div (1-0.8)(\text{g/cm}^3) = 5 \text{ cm}^3$$

$$\text{Volume of the components other than the porous black pigment} = \text{mass (g)} \div 1 \text{ (g/cm}^3\text{)} \quad (2)$$

For example, the volume of 1 g of binder component is as follows.

$$1 \text{ (g)} \div 1 \text{ (g/cm}^3\text{)} = 1 \text{ cm}^3$$

When A(g) of porous black pigment and B(g) of binder component are used, the occupied volume ratio of them can be expressed by (1)×A:(2)×B.

[Binder Component]

The binder component that can be used in the present disclosure is not particularly limited and examples of the binder component include polyurethane resins, polyester resins, polyesterurethane resins, urethane-urea resins, alkyd resins, butyral resins, acetal resins, polyamide resins, acrylic resins, styrene-acrylic resins, styrene resins, nitrocellulose, benzyl cellulose, cellulose(tri)acetate, casein, shellac, Gilsonite, styrene-maleic anhydride resins, polybutadiene resins, polyvinyl chloride resins, polyvinylidene chloride resins, polyvinylidene fluoride resins, polyvinyl acetate resins, ethylene vinyl acetate resins, vinyl chloride-vinyl acetate copolymer resins, vinyl chloride/vinyl acetate/maleic acid copolymer resins, fluorine resins, silicon resins, epoxy resins, phenoxy resins, phenol resins, maleic acid resins, urea resins, melamine resins, benzoguanamine resins, ketone resins, petroleum resins, rosin, rosin ester, polyvinyl alcohol, polyvinylpyrrolidone, polyacrylamide, hydroxyethyl cellulose, hydroxypropyl cellulose, methyl cellulose, ethyl cellulose, hydroxyethyl methylcellulose, hydroxypropyl methylcellulose, carboxymethyl cellulose, carboxymethyl ethyl cellulose, carboxymethyl nitrocellulose, ethylene/vinyl alcohol resins, polyolefin resins, chlorinated polyolefin resins, modified chlorinated polyolefin resins, chlorinated polyurethane resins and the like.

A curing agent may be used as necessary in the present disclosure. The curing agent that can be used is not particularly limited, and examples of the curing agent include polyisocyanate, epoxy resins and the like.

As the binder component, an electron beam-curable or ultraviolet-curable material including an oligomer and/or a monomer may be used.

Examples of a monofunctional monomer include, but not particularly limited thereto, 2-(2-ethoxyethoxy)ethyl(meth) acrylate, stearyl(meth)acrylate, tetrahydrofurfuryl(meth) acrylate, lauryl(meth)acrylate, 2-phenoxyethyl(meth)acrylate, isodecyl(meth)acrylate, isooctyl(meth)acrylate, tridecyl (meth)acrylate, caprolactone(meth)acrylate, 4-hydroxybutyl (meth)acrylate, ethoxylated nonylphenol(meth)acrylate, propoxylated nonylphenol(meth)acrylate, phenoxyethyl (meth)acrylate, phenoxydiethylene(meth)acrylate, ethylene oxide-modified nonylphenyl(meth)acrylate, methoxytriethylene glycol(meth)acrylate, ethylene oxide 2-ethylhexyl (meth)acrylate, isobornyl(meth)acrylate, dipropylene glycol (meth)acrylate and the like.

The term "(meth)acrylate" herein means methacrylate and acrylate and the term "(meth)acryloyl" herein means methacryloyl and acryloyl.

Examples of a difunctional monomer includes 1,3-butanediol di(meth)acrylate, 1,4-butanediol di(meth)acrylate, polyethylene glycol di(meth)acrylate, polypropylene glycol di(meth)acrylate, neopentyl glycol di(meth)acrylate, propoxylated neopentyl glycol di(meth)acrylate, ethoxylated neopentyl glycol di(meth)acrylate, hydroxypivalic acid neopentyl glycol di(meth)acrylate, (hydrogenated) bisphenol A di(meth)acrylate, (hydrogenated) ethylene oxide-modified bisphenol A di(meth)acrylate, (hydrogenated) propylene glycol-modified bisphenol A di(meth)acrylate, 1,6-hexanediol di(meth)acrylate, 2-ethyl,2-butyl-propanediol di(meth)acrylate, 1,9-nonanediol di(meth)acrylate and the like.

Examples of a polyfunctional monomer include tris(2-hydroxyethyl)isocyanurate tri(meth)acrylate, ethylene oxide-modified trimethylolpropane tri(meth)acrylate, propylene oxide-modified trimethylolpropane tri(meth)acrylate, propylene oxide-modified glyceryl tri(meth)acrylate, pentaerythritol tri(meth)acrylate, trimethylolpropane(meth) acrylate, ethylene oxide-modified trimethylolpropane(meth) acrylate, propylene oxide-modified trimethylolpropane (meth)acrylate, tri(meth)acryloyloxyethyl isocyanurate, pentaerythritol tetra(meth)acrylate, ditrimethylolpropane tetra(meth)acrylate, dipentaerythritol hydroxy penta(meth) acrylate, ethoxylated pentaerythritol tetra(meth)acrylate, penta(meth)acrylate esters, dipentaerythritol hexa(meth) acrylate and the like.

A photopolymerization initiator used when a radical polymerizable crosslinking component is crosslinked by ultraviolet light includes, but not particularly limited thereto, acetophenones, benzophenones, thioxanthones, aromatic diazonium salts, metallocene and the like. A polymerization accelerator may be used in combination, and examples of the polymerization accelerator include amines, phosphines and the like. The above components may not be contained when the radical polymerizable crosslinking component is crosslinked by using electron beams.

A cationic initiator used when a cationically-reactive component is crosslinked by using ultraviolet light includes Louis acid diazonium salt, Louis acid iodonium salt, Louis acid sulfonium salt, Louis acid phosphonium salt, other halides, a triazine initiator, a borate initiator, other photoacid generators and the like. The above components may not be contained when the cationically-reactive component is crosslinked by using electron beams.

The binder resin, the oligomer, and the monomer may be used alone or in a combination thereof.

The low-reflectivity black film according to the present disclosure may further contain a pigment dispersing agent, a surfactant, a coupling agent, or a pigment derivative. The pigment derivative is the one in which a specific substituent is introduced in a residue of organic pigment described in the color index.

The low-reflectivity black film according to the present disclosure may include, as necessary, a flame retardant, fillers, and other various additives. The flame retardant includes, for example, aluminum hydroxide, magnesium hydroxide, and phosphite compounds.

The additives include, for example, a coupling agent to improve the substrate adhesion, ion trapping agents or antioxidants to improve reliability when moisture is absorbed or a temperature is high, and a leveling agent.

<Dispersion Medium>

The paint for the low-reflectivity black film includes a dispersion medium for dispersing a porous black pigment. The dispersion medium to be used is preferably liquid at a temperature of 25° C. Specifically, it may be known solvents like ester solvents such as ethyl acetate, n-propyl acetate, isopropyl acetate, isobutyl acetate, and propylene glycol monomethyl ether acetate; alcohol solvents such as methanol, ethanol, n-propanol, isopropanol, and n-butanol; aromatic solvents such as benzene, toluene, and xylene; ketone solvents such as acetone, methyl ethyl ketone, diisopropyl ketone, and cyclohexanone; hydrocarbon solvents such as n-octane. These may be used alone or in a combination thereof.

The paint for the low-reflectivity black film can be obtained in various methods.

The above methods may be include, for example, a method of dispersing a porous black pigment in a dispersion medium; a method of adding a binder component or a binder solution in which a binder component is dissolved in a dispersion medium to a dispersion liquid in which a porous black pigment is dispersed in a dispersion medium; and a method of dispersing a porous black pigment into a binder solution in which a binder component is dissolved in a dispersion medium.

The disperser that can be used to obtain the paint for the low-reflectivity black film is not particularly limited and may be, for example, a kneader; an attritor; a ball mill; a media disperser such as a sand mill, SCANDEX, an eiger mill, a paint conditioner, and a paint shaker that use glass beads, zirconia beads or the like; or a colloid mill.

<Low-Reflectivity Black Film>

The low-reflectivity black film according to the present disclosure will be described.

As described above, the low-reflectivity black film according to the present disclosure includes a porous black pigment having a porosity of 50% or larger. Rt is 0.15-5 μm, and preferably 0.15-2 μm. When Rt is 0.15 μm or larger, the convex part of the film surface has a sufficiently large size and the regular reflection can be reduced. Since Rt is equal to or smaller than 5 μm, the scattering reflection can be reduced and a film with a smooth appearance can be obtained. When Rt is 2 μm or smaller, the regular reflection and the scattering reflection can be reduced.

Ra is 0.01-0.5 μm, and preferably 0.01-0.15 μm. When Ra is 0.01 μm or larger, the convex part of the film surface can have a sufficiently large size and the regular reflection can be reduced. When Ra is equal to or smaller than 0.5 μm, the scattering reflection can be reduced and a film with a smooth appearance can be obtained. When Ra is equal to or smaller than 0.15 μm, the regular reflection and the scattering reflection can be reduced.

While there is originally a tradeoff relation between the regular reflection and the scattering reflection, this tradeoff relation can be cancelled by setting the values of Rt and Ra to appropriate ones.

The symbols Rt and Ra, which are the roughness parameters of the low-reflectivity black film, indicate the values measured by a method in compliance with JIS B0601:2001. The symbol Rt, which indicates the maximum sectional height of the roughness curve, is the sum of the maximum value of the height profile Zp of the outline curve in the evaluation length and the maximum value of the valley depth Zv, and can be obtained by the following expression. The symbol Ra, which indicates the arithmetic average roughness, can be obtained by the following expression when only the reference length is extracted from the roughness curve in the direction of the average line, the direction of the average line for this extraction part is set in the X axis, the direction of the vertical magnification is set in the Z axis, and the roughness curve is expressed by the expression: $Z=f(x)$.

$$Rt = \max(Zpi) + \max(Zvi) \qquad \text{[Expression 1]}$$

$$Ra = \frac{1}{\ell r} \int_0^{\ell r} |Z(x)| dx \qquad \text{[Expression 2]}$$

The L* value of the low-reflectivity black film according to the present disclosure is 20 or smaller, and preferably 10 or smaller. When the L* value of the low-reflectivity black film according to the present disclosure is 20 or smaller, it is possible to obtain a bright black film with a high jet black property. The L* value, which is one of parameters in the L*, a*, b* color system, can be measured using a spectrophotometer (e.g., CM-700d manufactured by KONICA MINOLTA, INC.).

The maximum value of the regular reflectivity of the low-reflectivity black film according to the present disclosure in 400-700 nm is 0.8% or smaller, preferably 0.4% or smaller, and more preferably 0.1% or smaller. When the regular reflectivity is 0.8% or smaller, low reflectivity appears, and defects in appearance such as a reflected image of a fluorescent lamp become inconspicuous. The maximum value of the scattering reflectivity in 400-700 nm is 2% or smaller, preferably 1.3% or smaller, and more preferably 0.9% or smaller. When the scattering reflectivity is 2% or smaller, the low-reflectivity black film according to the present disclosure appears low reflectivity and has a high jet black property.

The reflection component and the scattering reflection component of the low-reflectivity black film according to the present disclosure are measured using a spectrophotometer (e.g., CM-700d manufactured by KONICA MINOLTA, INC.).

The regular reflection component is a rate of a regular reflection light with respect to an incident light and the regular reflection light is a reflection light in which the scattering reflection light is removed from the entire reflection light.

The scattering reflection component is a rate of the scattering reflection light (diffusion light) to the incident light and the scattering reflection light (diffusion light) is a reflection light obtained by removing the regular reflection light from the entire reflection light.

The maximum value of the transmittance in 400-700 nm of the low-reflectivity black film according to the present disclosure is 5% or lower, preferably 2% or lower. When the transmittance is equal to or smaller than 5%, the low-reflectivity black film according to the present disclosure becomes a black film having a low transparency. The transmittance is measured using a spectrophotometer (e.g., U-4100 manufactured by Hitachi High-Tech Corporation).

The film thickness of the low-reflectivity black film according to the present disclosure is preferably 0.3 μm or larger, and more preferably 1 μm or larger. When the film thickness is 0.3 µm or larger, the low-reflectivity black film according to the present disclosure has a low reflectivity and a high jet black property.

<Method of Manufacturing Laminated Body Having Low-Reflectivity Black Film>

The laminated body according to the present disclosure includes a substrate and the aforementioned low-reflectivity black film according to the present disclosure having properties such as a specific surface state (specific Rt and specific Ra).

The laminated body including the low-reflectivity black film can be obtained by various methods.

The above method may be, for example, a method including a step of preparing a paint for a low-reflectivity black film containing a porous black pigment having a porosity of 50% or larger, a dispersion medium, and a binder component as necessary, an average dispersed particle size (d50) of the porous black pigment being 0.2-10 µm, a step of coating the substrate with the paint for the low-reflectivity black film, and a step of drying a coating film formed of the paint for the low-reflectivity black film.

The average dispersed particle size (d50) of the porous black pigment in the dispersion liquid is preferably 0.3-5 µm. By using the paint for the low-reflectivity black film having d50 of 0.2 µm or larger, Rt and Ra of the film surface can be made sufficiently large and both the regular reflectivity and the scattering reflectivity can be made small. By using the paint for the low-reflectivity black film having d50 of 10 µm or smaller, it is possible to prevent the surface roughness from becoming too large (that is, to prevent Rt and Ra from becoming excessively large), make the film smooth as appropriate, and make the scattering reflectivity small.

The average dispersed particle size (d50) of the paint for the low-reflectivity black film can be obtained using a laser diffraction/scattering type particle size distribution measuring device such as Microtrac MT3000II (manufactured by MicrotracBEL Corp.) The measurement is performed on the sample diluted by using a dispersion medium used for the dispersion liquid at a temperature of 25° C.

Other than the above method, the laminated body including the low-reflectivity black film may be formed by a method of providing a resin layer that does not contain a porous black pigment on a substrate, coating this resin layer with a paint containing a porous black pigment and a dispersion medium, and removing the dispersion medium by drying it.

The substrate may be, but not particularly limited thereto, a glass substrate, a plastic substrate (an organic polymer substrate), a metal substrate, a paper substrate, a wooden substrate (a substrate made of wood), a stone substrate, a cloth substrate, a leather substrate and the like. The shape thereof may be a flat plate shape, a film shape, a sheet shape, or a solid shape, and may be selected as appropriate depending on its applications or usage conditions.

The substrate may preferably be a film of a synthetic resin such as polyester, polypropylene, polyethylene, and nylon, a complex including these films, glass or the like.

The paint for the low-reflectivity black film can be applied by a known method such as gravure printing, flexographic printing, inkjet printing, coater coating, spray coating, and spin coater coating. Specifically, for example, the low-reflectivity black film according to the present disclosure may be easily obtained by coating one principal surface of a substrate with the above black paint by various coating methods such as a roll coating method, a spin coating method, a dip coating method, a spray coating method, a bar-coating method, a slit-coating method, a slit spin coating method, a flow coating method, and a die coating method to form a coating film, removing a dispersion medium such as an organic solvent from this coating film by volatilization to form a film, and curing this film as necessary.

The resin used for the resin layer provided between the substrate and the low-reflectivity black film may be, but not particularly limited thereto, acrylic resins, nitrocellulose resins, chlorinated polypropylene resins, vinyl acetate resins, polyamide resins, polyester resins, alkyd resins, polyvinyl chloride resins, rosin resins, rosin-modified maleic acid resins, terpene resins, phenol-modified terpene resins, ketone resins, cyclized rubbers, chlorinated rubbers, butyral, petroleum resins, and modified resins of these resins. These resins may be used alone or in a combination thereof. The resin layer may be coated by a known method such as gravure printing, flexographic printing, inkjet printing, coater coating, and spin coater coating.

Another method of manufacturing the laminated body including the low-reflectivity black film will be described.

The laminated body including the low-reflectivity black film may be manufactured by a method including the following Steps 1-4 without using a paint for a low-reflectivity black film in which the average dispersed particle size (d50) of the porous black pigment is 0.2-10 µm.

Step 1: coating a peelable surface of a peelable sheet with a paint for a low-reflectivity black film containing a porous black pigment having a porosity of 50% or larger, a dispersion medium, and a binder component as necessary, and drying a coating film formed of the paint to form a black film;

Step 2: providing an adhesive layer on the substrate;

Step 3: overlapping the adhesive layer provided on the substrate with the black film formed on the peelable sheet, and pressing or heating and pressing the overlapped layer and film to obtain a laminated body with a peelable sheet including the substrate, the adhesive layer, the black film, and the peelable sheet; and Step 4: peeling the peelable sheet from the laminated body with the peelable sheet to form a low-reflectivity black film that includes the porous black pigment and the binder component at a volume ratio of 50:50-100:0, in which, with regard to surface roughness parameters Rt and Ra, Rt is 0.15-5 µm and Ra is 0.01-0.5 µm, an L* value is equal to or smaller than 20, and in a range of 400-700 nm, the maximum value of regular reflectivity is equal to or smaller than 0.8%, the maximum value of scattering reflectivity is equal to or smaller than 2%, and the maximum value of light transmittance is equal to or smaller than 5%.

By peeling the peelable sheet, the low-reflectivity black film whose surface has the aforementioned state can be obtained.

The peelable sheet may be the one obtained by performing known demolding processing on a surface of a resin film such as a polyester film, a polyethylene film, a polypropylene film, and a polyimide film.

The material for the adhesive layer is not particularly limited and examples of the material include, for example, acrylic resins, nitrocellulose resins, chlorinated polypropylene resins, vinyl acetate resins, polyamide resins, polyester resins, alkyd resins, polyvinyl chloride resins, rosin resins, rosin-modified maleic acid resins, terpene resins, phenol-modified terpene resins, ketone resins, cyclized rubbers, chlorinated rubbers, butyral, petroleum resins, modified resins of these resins and the like. These resins may be used alone or in a combination thereof. The adhesive layer may be coated by a known method such as gravure printing, flexographic printing, inkjet printing, coater coating, and spin coater coating.

In the Step 3 in which the adhesive layer provided on the substrate overlaps with the black film formed on the peelable sheet, pressure can be applied using a roller or the like or heat and pressure can be applied using a laminator. The heating and pressing conditions using the laminator are not particularly limited. The heating temperature is preferably a temperature higher than the glass transition temperature (Tg) of the adhesive layer by about 20° C. and the pressure to be applied is preferably 0.1 MPa-10 MPa.

Further, the laminated body including the low-reflectivity black film may be manufactured by a method including the following Steps A and B:

Step A: coating a substrate with a paint for a low-reflectivity black film and drying a coating film formed of the paint to form a black film; and Step B: preparing a mold in which, with regard to surface roughness parameters Rt and Ra, Rt is 0.15-5 µm and Ra is 0.010-0.5 µm, pressing the surface of irregularities of this mold against the surface of the above black film, and transferring the shape of the surface of the mold to the surface of the black film to form a low-reflectivity black film having an L* value of 20 or smaller.

Even when the paint for the low-reflectivity black film in which the average dispersed particle size (d50) of the porous black pigment is 0.2-10 µm is not used, by using the mold having the surface irregularities as described above, the low-reflectivity black film whose surface has the aforementioned state can be obtained.

EXAMPLES

In the following, the present disclosure will be described in detail with reference to Examples. However, the present disclosure is not limited to these Examples. Further, unless otherwise specified, "part(s)" indicates pts·mass.

<Hydroxyl Value (OHV) and Acid Value (AV)>

The hydroxyl value (OHV) and the acid value (AV) were obtained in accordance with JIS K0070.

<Mass Average Molecular Weight (Mw)>

The molecular weight distribution was measured using a Gel Permeation Chromatography (GPC) apparatus (HLC-8220 manufactured by Tosoh Corporation) to obtain the mass average molecular weight (Mw). The symbol Mw represents a molecular weight calculated by using polystyrene as a standard substance. Shown below are conditions for the measurement.

Columns: The following columns were coupled to one another in series for use.

Guard column $H_{XL}$-H manufactured by Tosoh Corporation,
TSKgelG5000$H_{XL}$ manufactured by Tosoh Corporation,
TSKgelG4000$H_{XL}$ manufactured by Tosoh Corporation,
TSKgelG3000$H_{XL}$ manufactured by Tosoh Corporation,
TSKgelG2000$H_{XL}$ manufactured by Tosoh Corporation.
Detector: RI (differential refractometer),
Conditions for the measurement: column temperature 40° C.,
Eluent: tetrahydrofuran,
Flow rate: 1.0 mL/min.

[Synthesis Example 1] (Binder Component: Synthesis of Solution of Acrylic Resin)

20.0 parts of methyl methacrylate, 0.6 parts of methacrylic acid, 3.0 parts of methacrylic acid-2-hydroxyethyl, 76.4 parts of methacrylic acid n-butyl, and 100 parts of propylene glycol 1-monomethyl ether 2-acetate were added to a reaction vessel equipped with a stirrer, a thermometer, a reflux condenser, a dropper, and a nitrogen inlet tube. These materials were mixed with stirring in a nitrogen atmosphere and the temperature thereof was raised to 100° C. Next, 0.5 parts of azobisisobutyronitrile were added and a polymerization reaction was performed for two hours. Next, 0.5 parts of azobisisobutyronitrile were added for every one hour and a polymerization reaction was performed until the inversion rate reaches 98% or larger. After it was confirmed that the inversion rate became 98% or larger, 50 parts of propylene glycol 1-monomethyl ether 2-acetate were added to the reaction solution and diluted. In this way, a solution of an acrylic resin having an amount of solids content of 40% and Mw of 30,000 was obtained.

[Synthesis Example 2] (Adhesive Agent Component 1: Synthesis of Solution of Acrylic Resin)

60 parts of n-butyl acrylate, 30 parts of methyl acrylate, 5 parts of 2-ethylhexyl acrylate, 5 parts of acrylic acid, 70 parts of ethyl acetate, and 0.10 parts of 2,2'-azobis (2-methylbutyronitrile) were added to a reaction vessel equipped with a stirrer, a thermometer, a reflux cooling pipe, a dropper, and a nitrogen inlet tube. These materials were reacted at a reflux temperature for seven hours while stirring and mixing them in a nitrogen atmosphere. After the reaction was ended, ethyl acetate was added to the reaction solution and diluted to obtain a solution of an acrylic resin having an amount of solids content of 30% and a weight-average molecular weight Mw of 980,000.

[Synthesis Example 3] (Adhesive Agent Component 2: Synthesis of Solution of Acrylic Resin)

100 parts of toluene were added to a reaction vessel, and 96 parts of n-ethyl methacrylate, 4 parts of N,N-dimethylaminoethyl methacrylate, and 0.08 parts of 2,2'-azobis (2-methylbutyronitrile) were added to a dropper. After the air in the reaction vessel was substituted with nitrogen gas, the liquid in the dropper was added dropwise for one hour in a nitrogen atmosphere while stirring the liquid in the reaction vessel. After the completion of dropwise addition, the reaction solution was reacted at a reflux temperature for eight hours. After the reaction was ended, ethyl acetate was added to the reaction solution and diluted to obtain a solution of an acrylic resin having an amount of solids content of 30% and a weight-average molecular weight Mw of 30,000.

<Manufacturing of Adhesive Agent>

65 parts of the solution of the acrylic resin obtained in Synthesis Example 2, 35 parts of the solution of the acrylic resin obtained in Synthesis Example 3, and 50 parts of ethyl acetate were put in a vessel and mixed with stirring to obtain an adhesive agent 1.

<Manufacturing of Black Pigment Dispersion Liquid>

[Black Pigment Dispersion Liquid 1]

One part of porous black pigment ("carbon ECP" manufactured by Lion Specialty Chemicals Co., Ltd. porosity 60%, specific surface area 800 m$^2$/g), 0.2 parts of dispersing agent BYK111 (manufactured by BYK-Chemie GmbH), 50 parts of propylene glycol 1-monomethyl ether 2-acetate, and 25 parts of glass beads each having a diameter of 3 mm were added to a vessel, mixed with stirring, and dispersed for 30 minutes using a paint shaker to obtain a black pigment dispersion liquid 1.

[Black Pigment Dispersion Liquid 2]

A black pigment dispersion liquid 2 was obtained in the same manner as in the black pigment dispersion liquid 1 except that the dispersion time was changed to two hours.

[Black Pigment Dispersion Liquid 3]

A black pigment dispersion liquid 3 was obtained in the same manner as in the black pigment dispersion liquid 1 except that black pigment was dispersed for five minutes using a paint shaker using "carbon EC600JD" (having a porosity of about 80% and a specific surface area of 1400 $m^2/g$) manufactured by Lion Specialty Chemicals Co., Ltd. in place of the carbon ECP as the black pigment.

[Black Pigment Dispersion Liquids 4-6]

Black pigment dispersion liquids 4-6 were obtained in the same manner as in the black pigment dispersion liquid 3 except that the dispersion time was changed to 15 minutes, two hours, or six hours.

[Black Pigment Dispersion Liquid 7]

A black pigment dispersion liquid 7 was obtained in the same manner as in the black pigment dispersion liquid 1 except that the dispersion time was changed to ten hours.

[Black Pigment Dispersion Liquid 8]

A black pigment dispersion liquid 8 was obtained in the same manner as in the black pigment dispersion liquid 1 except that the dispersing agent was not used and the dispersion time was changed to five minutes.

[Black Pigment Dispersion Liquid 9]

A black pigment dispersion liquid 9 was obtained in the same manner as in the black pigment dispersion liquid 3 except that the dispersion time was changed to ten hours.

[Black Pigment Dispersion Liquid 10]

A black pigment dispersion liquid 10 was obtained in the same manner as in the black pigment dispersion liquid 3 except that the dispersing agent was not used and the dispersion time was changed to five minutes.

[Black Pigment Dispersion Liquids 11 and 12]

Black pigment dispersion liquids 11 and 12 were obtained in the same manner as in the black pigment dispersion liquid 1 except that "MA100" (specific surface area 110 $m^2/g$) manufactured by Mitsubishi Chemical Corporation was used in place of the carbon ECP as the black pigment and the dispersion time was changed to 30 minutes or two hours.

<Manufacturing of Black Pigment-Containing Paint>

[Black Pigment-Containing Paint 1]

0.55 parts of the solution of the acrylic resin obtained in Synthesis Example 1 were added to 40 parts of the black pigment dispersion liquid 1, and the obtained solution was mixed with stirring to obtain a black pigment-containing paint 1. The average dispersed particle size (d50) measured using the particle size distribution analyzer Microtrac MT3000II (manufactured by MicrotracBEL Corp.) was 1.49 μm.

[Black Pigment-Containing Paints 2-15 and 101-107]

Black pigment-containing paints 2-15 and 101-107 were obtained in the same manner as in the black pigment-containing paint 1 except that raw materials and formulations were changed as shown in Tables 1-1 and 2-1.

[Black Pigment-Containing Paint 16]

0.55 parts of the solution of the acrylic resin obtained in Synthesis Example 1 and 20 parts of propylene glycol 1-monomethyl ether 2-acetate were added to 40 parts of the black pigment dispersion liquid 5 to obtain a black pigment-containing paint 16. The average dispersed particle size (d50) measured using the particle size distribution analyzer Microtrac MT3000II (manufactured by MicrotracBEL Corp.) was 1.56 μm.

<Manufacturing of Low-Reflectivity Black Film>

Example 1

A polyester film (TOYOBO CO., LTD., E5101, thickness 188 μm), which is a substrate, was coated with the black pigment-containing paint 1 using a blade coater and a coating film formed of the paint was dried for two minutes at a temperature of 100° C. to obtain a black film (a low-reflectivity black film) 1 having a film thickness of 4.8 μm. The roughness of the film surface was measured by the following method to obtain Rt and Ra. The results of the evaluation are shown in Table 1-2.

Examples 2-14 and Comparative Examples 1-7

Black films (in Examples, low-reflectivity black films) 2-14 and 101-107 were obtained in the same manner as in Example 1 except that the black pigment-containing paint shown in Tables 1-1 and 2-1 was used in place of the black pigment-containing paint 1 and the film thickness was adjusted while changing the count of the blade coater as necessary. The results of the evaluation are shown in Tables 1-2 and 2-2.

Example 15

A peelable surface of a peelable sheet (demolding processing polyethylene terephthalate film having a thickness of 75 μm) was coated with the black pigment-containing paint 2 for Examples and a coating film formed of the paint was dried to form a black film.

Meanwhile, another polyester film (TOYOBO CO., LTD., E5101, thickness 188 μm), which is a substrate, was coated with the adhesive agent 1 and a coating film formed of the adhesive agent was dried to form an adhesive layer.

In a state in which the black film formed on the peelable sheet and the adhesive layer formed on the substrate overlap each other, heat and pressure were applied using a laminator (VA-700: Taisei Laminator Co., LTD.) under the conditions of 80° C., 0.4 MPa, and 0.5 m/s, and then the peelable sheet was peeled, thereby obtaining a laminated body including a black film (low-reflectivity black film) 15. The results of the evaluation are shown in Table 1-2.

Examples 16-20 and Comparative Example 8

Black films (in Examples, low-reflectivity black films) 16-20 and 108 were obtained in the same manner as in Example 15 except that the black pigment-containing paint shown in Tables 1-1 and 2-1 was used in place of the black pigment-containing paint 2. The results of the evaluation are shown in Tables 1-2 and 2-2.

Example 21

A steel plate having a thickness of 2 mm, which is a substrate, was coated with the black pigment-containing paint 16 by spray coating and the obtained plate was dried at a temperature of 100° C. for two minutes to obtain a black film (low-reflectivity black film) 21 having a film thickness of 5.1 μm. The roughness of the film surface was measured by the following method to obtain Rt and Ra. The results of the evaluation are shown in Table 1-2.

Example 22

A three-dimensional substrate made of polyester was coated with the black pigment-containing paint 16 by spray coating and a coating film formed of the paint was dried at a temperature of 100° C. for two minutes to obtain a black film (low-reflectivity black film) 22 having a film thickness of 4.8 μm. The roughness of the film surface was measured by the following method to obtain Rt and Ra. The results of the evaluation are shown in Table 1-2.

[Method of Measuring Rt, Ra, and Film Thickness]

Rt, Ra, and the film thickness were measured using Form Talysurf series i60 manufactured by Taylor Hobson. The conditions for the measurement are shown as follows and the average value of five times of measurement was employed as data.
Type of needle: Diamond stylus having a tip size of 2 μm,
Cutoff frequency λc: 0.08 mm,
Measurement length: 10 mm,
Speed: 20 mm/min.

[Method of Measuring Reflectance]

Each black film was placed on a white calibration plate, and a regular reflection component and a scattering reflection component were measured under the conditions of the angle of view of 10° and a light source D65 using a spectrophotometer (CM-700d manufactured by KONICA MINOLTA, INC.).

[Method of Measuring L* Value]

Each black film was placed on a white calibration plate and the L* value was measured under the conditions of the angle of view of 10° and a light source D65 using a spectrophotometer (CM-700d manufactured by KONICA MINOLTA, INC.).

[Method of Measuring Transmittance]

The transmittance was measured using a spectrophotometer (U-4100 manufactured by Hitachi High-Tech Corporation).

[Evaluation Method and Evaluation Criteria of Scratch Resistance]

The surface of the black film was rubbed back and force once with a cotton swab while keeping the angle of this cotton swab that touches the surface of the black film at 45° to observe the state of the film.

○ (excellent): No peeling was observed.

Δ (good): Less than 30% of the area of the film that has been rubbed with the swab was peeled off and a base (film) appeared.

x (poor): 30% or more of the area of the film that has been rubbed with the swab was peeled off and the base (film) appeared.

TABLE 1-1

| | | Black film | Black pigment-containing paint | Black pigment dispersion liquid | Black pigment Type | Porosity | Specific surface area | Dispersion time | Pig/Binder Mass ratio | Pig/Binder Volume ratio | Dispersing agent | Dispersed particle diameter μm | Manufacturing method |
|---|---|---|---|---|---|---|---|---|---|---|---|---|---|
| Example | 1 | 1 | 1 | 1 | ECP | 60 | 800 | 30 min. | 78/22 | 90/10 | Used | 1.49 | 1 |
| | 2 | 2 | 2 | 2 | | | | 2 hr | 78/22 | 90/10 | Used | 0.77 | |
| | 3 | 3 | 3 | | | | | 2 hr | 48/62 | 69/31 | Used | 0.86 | |
| | 4 | 4 | 4 | 3 | EC600JD | 80 | 1400 | 5 min. | 65/35 | 90/10 | Used | 8.10 | |
| | 5 | 5 | 5 | 4 | | | | 15 min. | 65/35 | 90/10 | Used | 5.10 | |
| | 6 | 6 | 6 | 5 | | | | 2 hr | 65/35 | 90/10 | Used | 0.85 | |
| | 7 | 7 | 7 | 6 | | | | 6 hr | 65/35 | 90/10 | Used | 0.31 | |
| | 8 | 8 | 8 | 5 | | | | 2 hr | 100/0 | 100/0 | Used | 0.83 | |
| | 9 | 9 | 9 | | | | | | 90/10 | 95/5 | Used | 0.85 | |
| | 10 | 10 | 10 | | | | | | 45/55 | 82/18 | Used | 0.79 | |
| | 11 | 11 | 11 | | | | | | 30/70 | 69/31 | Used | 0.81 | |
| | 12 | 12 | 12 | | | | | | 20/80 | 56/44 | Used | 0.84 | |
| | 13 | 13 | 6 | 5 | | | | 2 hr | 65/35 | 90/10 | Used | 0.85 | |
| | 14 | 14 | | | | | | | | | Used | 0.85 | |
| | 15 | 15 | 2 | 2 | ECP | 60 | 800 | 2 hr | 78/22 | 90/10 | Used | 0.77 | 2 |
| | 16 | 16 | 6 | 5 | EC600JD | 80 | 1400 | 2 hr | 65/35 | 90/10 | Used | 0.85 | |
| | 17 | 17 | 11 | 5 | EC600JD | | | | 30/70 | 69/31 | Used | 0.85 | |
| | 18 | 18 | 13 | 2 | ECP | 60 | 800 | 2 hr | 78/22 | 90/10 | Used | 0.12 | |
| | 19 | 19 | 14 | 5 | EC600JD | 80 | 1400 | 2 hr | 65/35 | 90/10 | Used | 0.12 | |
| | 20 | 20 | 15 | | | | | | 30/70 | 69/31 | Used | 0.10 | |
| | 21 | 21 | 16 | 5 | EC600JD | 80 | 1400 | 2 hr | 65/35 | 90/10 | Used | 0.83 | 3 |
| | 22 | 22 | 16 | 5 | EC600JD | 80 | 1400 | 2 hr | 65/35 | 90/10 | Used | 0.83 | 3 |

TABLE 1-2

| | | Black film | | | | | | |
|---|---|---|---|---|---|---|---|---|
| | | Surface roughness | Reflectivity | | | | Film | |
| | | | Regular | Scattering | | | | |
| | | Rt μm | Ra μm | reflection % | reflection % | L* | Transmittance % | thickness μm | Scratch resistance |

| | | Rt μm | Ra μm | Regular reflection % | Scattering reflection % | L* | Transmittance % | Film thickness μm | Scratch resistance |
|---|---|---|---|---|---|---|---|---|---|
| Example | 1 | 1.82 | 0.13 | 0.04 | 1.47 | 12.9 | 1.6 | 4.8 | ○ |
| | 2 | 0.89 | 0.05 | 0.08 | 1.51 | 13.6 | 1.6 | 4.5 | ○ |
| | 3 | 0.85 | 0.06 | 0.38 | 1.95 | 14.5 | 1.5 | 4.5 | ○ |
| | 4 | 4.35 | 0.45 | 0.02 | 1.59 | 10.3 | 1.5 | 4.8 | Δ |
| | 5 | 2.87 | 0.23 | 0.03 | 1.36 | 9.8 | 1.6 | 5.0 | ○ |
| | 6 | 1.09 | 0.05 | 0.09 | 1.03 | 10.4 | 1.5 | 4.9 | ○ |
| | 7 | 0.22 | 0.01 | 0.35 | 0.95 | 11.6 | 1.5 | 4.5 | ○ |
| | 8 | 1.95 | 0.19 | 0.02 | 0.74 | 8.0 | 1.5 | 4.6 | × |
| | 9 | 1.60 | 0.16 | 0.04 | 0.77 | 8.5 | 1.5 | 4.5 | Δ |
| | 10 | 1.08 | 0.05 | 0.16 | 1.32 | 12.1 | 1.8 | 4.6 | ○ |
| | 11 | 1.20 | 0.05 | 0.20 | 1.61 | 14.9 | 2.0 | 4.9 | ○ |
| | 12 | 1.34 | 0.05 | 0.78 | 1.98 | 16.3 | 2.2 | 4.5 | ○ |
| | 13 | 1.03 | 0.05 | 0.10 | 1.04 | 11.0 | 3.1 | 1.1 | ○ |
| | 14 | 1.25 | 0.06 | 0.12 | 1.08 | 12.0 | 4.2 | 0.5 | ○ |
| | 15 | 1.30 | 0.11 | 0.02 | 1.31 | 11.2 | 1.5 | 8.1 | ○ |
| | 16 | 1.63 | 0.15 | 0.01 | 0.80 | 8.3 | 1.4 | 8.5 | ○ |
| | 17 | 1.90 | 0.14 | 0.13 | 1.45 | 9.5 | 1.8 | 8.5 | ○ |
| | 18 | 0.62 | 0.05 | 0.70 | 1.40 | 17.5 | 2.0 | 8.4 | ○ |
| | 19 | 1.16 | 0.03 | 0.13 | 1.10 | 10.2 | 1.6 | 8.5 | ○ |
| | 20 | 0.76 | 0.06 | 0.40 | 1.50 | 14.6 | 2.0 | 8.4 | ○ |
| | 21 | 1.15 | 0.06 | 0.08 | 1.01 | 10.2 | 1.5 | 4.6 | ○ |
| | 22 | 1.20 | 0.06 | 0.08 | 1.00 | 10.1 | 1.5 | 4.9 | ○ |

TABLE 2-1

| | | Black film | Black pigment-containing paint | Black pigment dispersion liquid | Black pigment | | | Pig/Binder | | Dispersing agent | Dispersed particle diameter μm | Manufacturing method |
|---|---|---|---|---|---|---|---|---|---|---|---|---|
| | | | | | Type | Porosity | Specific surface area | Dispersion time | Mass ratio | Volume ratio | | | |
| Comparative Example | 1 | 101 | 101 | 7 | ECP | 60 | 800 | 10 hr | 78/22 | 90/10 | Used | 0.13 | 1 |
| | 2 | 102 | 102 | 8 | | 60 | 800 | 5 min. | 78/22 | 90/10 | Not used | 12.60 | |
| | 5 | 103 | 103 | 9 | EC600JD | 80 | 1400 | 10 hr | 65/35 | 90/10 | Used | 0.15 | |
| | 6 | 104 | 104 | 10 | | 80 | 1400 | 5 min. | 65/35 | 90/10 | Not used | 11.50 | |
| | 7 | 105 | 105 | 5 | EC600JD | 80 | 1400 | 2 hr | 65/35 | 90/10 | Used | 0.85 | |
| | 3 | 106 | 106 | 11 | MA100 | 0 | 110 | 30 min. | 90/10 | 90/10 | Used | 1.29 | |
| | 4 | 107 | 107 | 12 | MA100 | 0 | 110 | 2 hr | 90/10 | 90/10 | Used | 0.68 | |
| | 8 | 108 | 103 | 12 | MA100 | 0 | 110 | 2 hr | 90/10 | 90/10 | Used | 0.68 | 2 |

TABLE 2-2

| | | Black film | | | | | | | |
|---|---|---|---|---|---|---|---|---|---|
| | | Surface roughness | | Reflectivity | | | | Film | |
| | | Rt μm | Ra μm | Regular reflection % | Scattering reflection % | L* | Transmittance % | thickness μm | Scratch resistance |
| Comparative Example | 1 | 0.12 | 0.01 | 1.02 | 1.35 | 20.5 | 1.8 | 4.6 | ○ |
| | 2 | 6.80 | 0.59 | 0.65 | 2.33 | 17.3 | 2.3 | 4.9 | ○ |
| | 5 | 0.13 | 0.01 | 0.91 | 1.19 | 18.6 | 1.7 | 4.6 | ○ |
| | 6 | 5.90 | 0.68 | 0.58 | 2.15 | 16.4 | 2.0 | 4.8 | ○ |
| | 7 | 0.87 | 0.05 | 1.31 | 3.10 | 23.0 | 7.0 | 0.1 | ○ |
| | 3 | 1.02 | 0.09 | 2.07 | 3.59 | 22.4 | 1.8 | 4.1 | ○ |
| | 4 | 0.54 | 0.03 | 3.51 | 1.51 | 26.3 | 1.9 | 4.0 | ○ |
| | 8 | 0.89 | 0.04 | 3.05 | 1.93 | 25.1 | 2.0 | 8.1 | ○ |

INDUSTRIAL APPLICABILITY

The low-reflectivity black film according to the present disclosure may be applied to, for example, imaging optical members such as lens holding members, cameras, microscopes, binoculars, telescopes, and endoscopes; projection optical members such as projectors; optical members such as laser devices, spectrophotometers, radiation thermometers, sensor elements, and lighting apparatuses; jigs and the like. In the above applications, a stray light prevention effect can be predicted.

The low-reflectivity black film according to the present disclosure may further be used for exterior parts of home appliances or furniture; interior or exterior parts of automobiles; building materials; clothes; wall papers; signboards and the like. In the above applications, the low-reflectivity black film according to the present disclosure may be used as a design member that has both a low reflectivity and smoothness, or an antidazzle member that utilizes the low reflectivity.

The low-reflectivity black film according to the present disclosure can further be used as a light-shielding part in a display device including a plurality of pixels and light-shielding parts (black matrices) arranged between these plurality of respective pixels. In this application, by providing the light-shielding parts having a high degree of blackness and a low reflectivity between the plurality of respective pixels, it can be expected that the contrast will be improved.

The low-reflectivity black film according to the present disclosure can be applied not only to the above applications but also to elements of panels for photovoltaic power generation, elements of solar heat collection panels, photothermal conversion members and the like using a light absorption property that can be caused by the low reflectivity.

The invention claimed is:

1. A low-reflectivity black film comprising:
a porous carbon black pigment having a porosity of 50% or larger and a binder component at a volume ratio of 85:15-95:5, wherein
with regard to surface roughness parameters Rt and Ra, Rt is 0.15-5 µm and Ra is 0.01-0.5 µm,
an L* value is equal to or smaller than 20, and in a range of 400-700 nm, a maximum value of regular reflectivity is equal to or smaller than 0.8%, a maximum value of scattering reflectivity is equal to or smaller than 2%, and a maximum value of light transmittance is equal to or smaller than 5%, and
wherein the Rt and Ra are measured by a method in compliance with JIS B0601:2001, the L* value, the regular reflectivity, and the scattering reflectivity are measured by a first spectrophotometer, and the light transmittance is measured by a second spectrophotometer.

2. The low-reflectivity black film according to claim 1, wherein, in a range of 400-700 nm, the maximum value of the regular reflectivity is equal to or smaller than 0.4% and the maximum value of the scattering reflectivity is equal to or smaller than 1.3%.

3. The low-reflectivity black film according to claim 1, wherein Rt is 0.15-2 µm and Ra is 0.01-0.15 µm.

4. The low-reflectivity black film according to claim 1, wherein the low-reflectivity black film has a thickness equal to or larger than 0.3 µm.

5. The low-reflectivity black film according to claim 1, wherein a BET specific surface area of the porous black pigment is equal to or larger than 600 m²/g.

6. A method of manufacturing a laminated body including a substrate and a low-reflectivity black film, comprising:
preparing a paint for a low-reflectivity black film containing a porous carbon black pigment having a porosity of 50% or larger, a dispersion medium, and a binder component, an average dispersed particle size of the porous black pigment being 0.2-10 µm;
coating the substrate with the paint for the low-reflectivity black film; and
drying a coating film formed of the paint for the low-reflectivity black film, wherein
the low-reflectivity black film includes the porous black pigment and the binder component at a volume ratio of 85:15-95:5,
with regard to surface roughness parameters Rt and Ra, Rt is 0.15-5 µm and Ra is 0.01-0.5 µm,
an L* value is equal to or smaller than 20, and
in a range of 400-700 nm, a maximum value of regular reflectivity is equal to or smaller than 0.8%, a maximum value of scattering reflectivity is equal to or smaller than 2%, and a maximum value of light transmittance is equal to or smaller than 5%,
wherein the Rt and Ra are measured by a method in compliance with JIS B0601:2001, the L* value, the regular reflectivity, and the scattering reflectivity are measured by a first spectrophotometer, and the light transmittance is measured by a second spectrophotometer.

7. The method of manufacturing the laminated body according to claim 6, wherein the low-reflectivity black film has a film thickness equal to or larger than 0.3 µm.

8. The method of manufacturing the laminated body according to claim 7, wherein a BET specific surface area of the porous black pigment is equal to or larger than 600 m²/g.

* * * * *